(12) United States Patent
Kusano (10) Patent No.: US 7,753,230 B2
(45) Date of Patent: Jul. 13, 2010

(54) NUT FEEDER

(76) Inventor: Mikio Kusano, 437 Cloverdale Ave., Cincinnati, OH (US) 45246

(*) Notice: Subject to any disclaimer, the term of this patent is extended or adjusted under 35 U.S.C. 154(b) by 335 days.

(21) Appl. No.: 11/960,897

(22) Filed: Dec. 20, 2007

(65) Prior Publication Data

US 2009/0162182 A1 Jun. 25, 2009

(51) Int. Cl.
*B65G 59/06* (2006.01)
(52) U.S. Cl. .................. 221/278; 221/208
(58) Field of Classification Search ........ 221/1–312 C
See application file for complete search history.

(56) References Cited

U.S. PATENT DOCUMENTS

| | | | | |
|---|---|---|---|---|
| 1,969,368 | A * | 8/1934 | Hansen | 91/470 |
| 3,675,838 | A * | 7/1972 | Bakoledis | 227/8 |
| 3,735,632 | A * | 5/1973 | Hilton | 72/453.01 |
| 4,240,620 | A * | 12/1980 | Tunkers | 269/24 |
| 4,410,103 | A | 10/1983 | Fuhrmeister | |
| 4,604,024 | A * | 8/1986 | Edwards et al. | 414/592 |
| 4,700,611 | A * | 10/1987 | Kaneko | 91/405 |
| 4,744,238 | A * | 5/1988 | Halbert | 29/812.5 |
| 5,191,720 | A * | 3/1993 | Miura et al. | 33/785 |
| 5,230,141 | A | 7/1993 | Aoyama | |
| 5,538,172 | A * | 7/1996 | Jochum et al. | 227/10 |
| 5,606,794 | A | 3/1997 | Leistner | |
| 5,895,584 | A * | 4/1999 | Sakota | 219/86.24 |
| 5,897,043 | A | 4/1999 | Veoukas et al. | |
| 5,979,168 | A * | 11/1999 | Beekman | 62/228.5 |
| 6,008,463 | A | 12/1999 | Aoyama et al. | |
| 6,041,493 | A * | 3/2000 | Donhauser | 29/715 |
| 6,163,004 | A | 12/2000 | Aoyama et al. | |
| 6,254,332 | B1 | 7/2001 | Miura et al. | |
| 6,559,406 | B2 * | 5/2003 | Stepetic et al. | 219/98 |
| 6,874,655 | B2 * | 4/2005 | Aoyama et al. | 221/213 |
| 7,291,801 | B2 * | 11/2007 | Aoyama et al. | 219/93 |
| 7,475,473 | B2 * | 1/2009 | Lang et al. | 29/798 |
| 7,575,139 | B2 * | 8/2009 | Thompson | 227/10 |
| 2003/0039532 | A1 * | 2/2003 | Aoyama et al. | 414/27 |
| 2003/0107170 | A1 * | 6/2003 | Becker | 271/307 |
| 2005/0056683 | A1 * | 3/2005 | Miura et al. | 228/47.1 |
| 2007/0170222 | A1 | 7/2007 | Bromley et al. | |

OTHER PUBLICATIONS

WeldParts EMIEMI-2 Feeder, WeldParts, Inc., Resistance Welding Accessories, http://weldparts.com/emiemi2.htm, Dec. 12, 2007, 2 pages.

* cited by examiner

*Primary Examiner*—Gene Crawford
*Assistant Examiner*—Kelvin L Randall, Jr.
(74) *Attorney, Agent, or Firm*—Steven J. Rosen (57) ABSTRACT

A nut feeder having a piston with a rod attached thereto disposed within a chamber of a cylinder. A rod air passage extending through the rod between a rear port at a groove circumscribed around a back end of the rod and a front end of the rod. A ring disposed within the groove and free to slide axially within the groove to cover and uncover the rear port. An air nozzle at the front end of the rod. One or more piston air passages extending through the piston to the groove. A stop at a front end of the chamber positioned to stop forward movement of the ring and cause the ring to cover the rear port. The air nozzle includes one or more apertures aimed backwards and the air nozzle may be in a pin at the front end of the rod.

25 Claims, 7 Drawing Sheets

NUT FEEDER

BACKGROUND OF THE INVENTION

1. Field of the Invention

This invention relates generally to nut feeders and, more particularly, to nut feeders for feeding nuts to nut resistance welding equipment and broadly to a nut feeder for feeding nuts to a predetermined position.

2. Description of Related Art

Nut feeders are used for feeding nuts to nut resistance welding equipment. One particular type of nut feeder is pneumatically operated. A pushrod is provided at its front end with a nut support and connected at its back end to a piston and cylinder powered by pressurized air. The piston and cylinder serve as an actuator and the nut is held in place during piston movement by the same pressurized air used to power the piston. A pushing operation of the pressurized air in the cylinder moves the pushrod forward to feed a nut held by the support to a target position of a workpiece. Complex valving and/or spring loaded pushrods have been used accomplish the reciprocating movement of the pushrod. It is desirable to have a pneumatic nut feeder that is simpler in design with less moving parts such as valves. It is also desirable to eliminate the use of spring loaded pushrods to make the nut feeders less expensive, faster, and more reliable to operate and also a more repeatable nut feeding operation.

BRIEF SUMMARY OF THE INVENTION

A nut feeder includes a piston disposed within a chamber of a cylinder, a rod attached to the piston, a rod air passage extending through the rod from a rear port at a groove circumscribed around a back end of the rod to a front end of the rod, and a ring disposed within the groove and free to slide axially within the groove and to cover and uncover the rear port. One or more piston air passages extend through the piston to the groove. An exemplary embodiment of the nut feeder includes an air nozzle with one or more apertures aimed backwards in a pin at the front end of the rod. A stop at a front end of the chamber of the cylinder is positioned to stop forward movement of the ring and cause the ring to cover the rear port.

The nut feeder may be used in a nut feeder system having a nut dispenser and a door in front of the nut feeder positioned and operable to axially restrain one of the nuts in front of the rod. Front and back casing ports are located at front and back ends respectively of the chamber respectively. A controller is operably connected to a pressurized air source valve for flowing pressurized air through the front and back casing ports to the front and back ends alternately during a cycle of operation of the nut feeder. The ring and the groove are operable to uncover the rear port during forward movement of the rod and to cover the rear port during backward movement of the rod.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
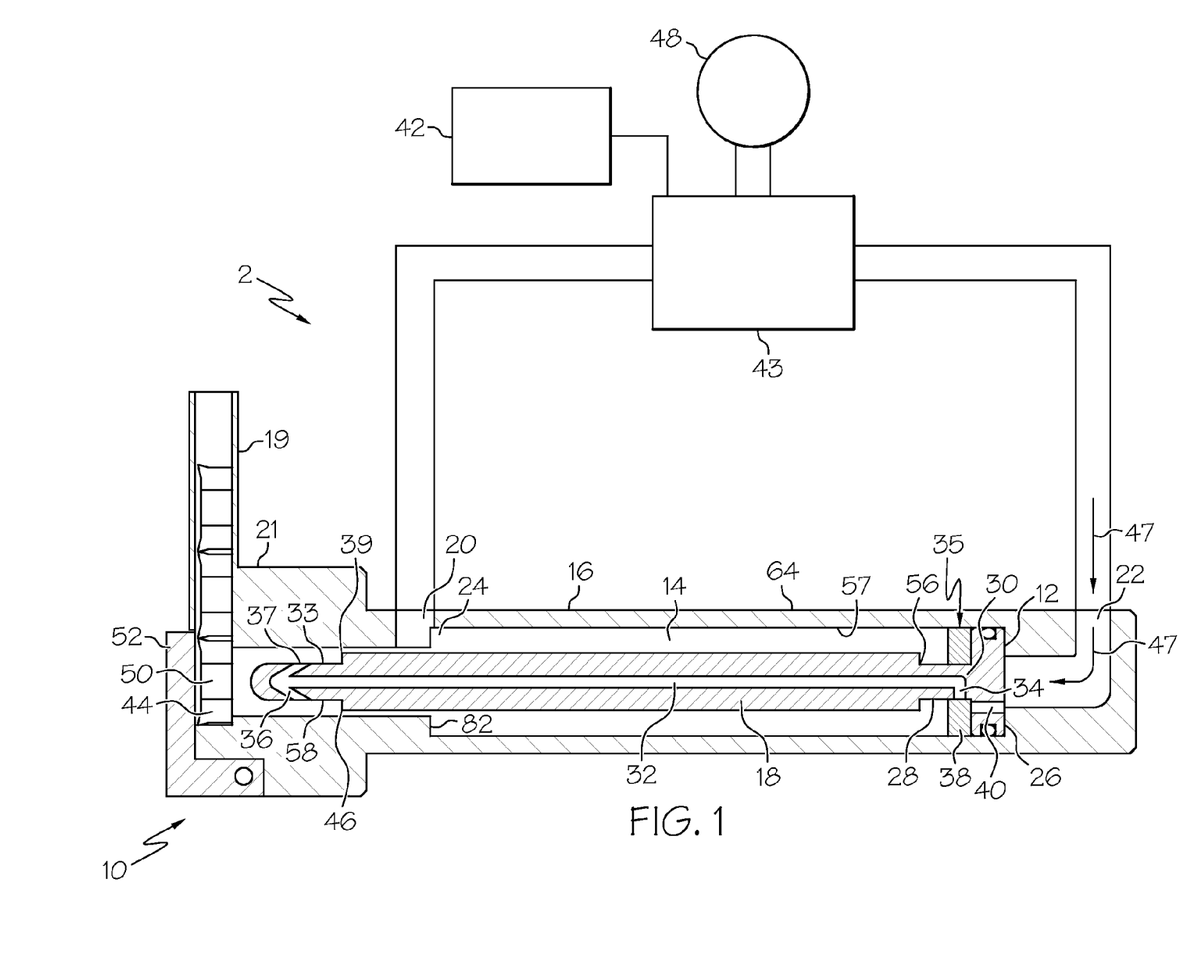
FIG. 1 is a partially schematical and partially cross-sectional view illustration of a nut feeder with a control valve and a rod attached to a piston disposed inside a chamber of a cylinder of the nut feeder.

Illustrated in FIG. 1 is a nut feeder system 2 including a nut feeder 10 having a piston 12 disposed within a chamber 14 of a cylinder 16 and a rod 18 attached to the piston 12. A nut dispenser 19 feeds nuts 44 to a front 21 of the nut feeder 10 one at a time. Front and back casing ports 20, 22 are used to alternatively pressurize front and back ends 24, 26 respectively of the chamber 14 during a cycle of the nut feeder's operation. The rod 18 includes a groove 28 circumscribed around a back end 30 of the rod 18. A rod air passage 32 extends through the rod from a rear port 34 at the groove 28 to an air nozzle 36 in a pin 33 at a front end 39 or tip 58 of the rod 18.

A ring 38 disposed within the groove 28 is free to slide axially within the groove 28 and to cover and uncover the rear port 34. Thus, the slidable ring 38 together with the rear port 34 serve as a valve, or more particularly, a ring valve 35 controlling pressurized air 47 entering rod air passage 32. The ring 38 extends radially outwardly from an annular hub 49 to an annular rim 54 of the ring. The rim 54 slidingly seals against an annular inner surface 57 of an annular wall 64 of the cylinder 16. The hub 49 slidingly seals against an annular outer surface 70 of the rod 18 within the groove 28. One or more piston air passages 40 extend through the piston 12 to the groove 28.

Figure 2:
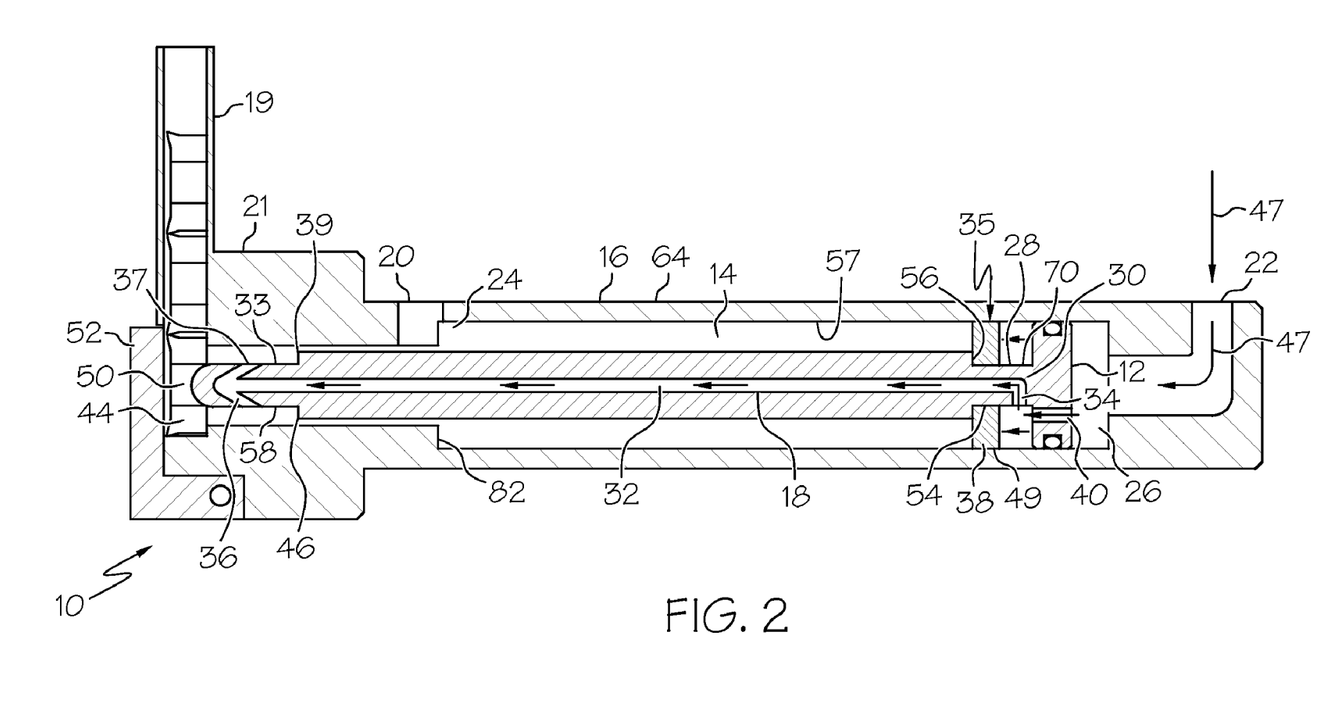
FIG. 2 is a cross-sectional view illustration of the cylinder illustrated in FIG. 1 with a ring valve in a fully opened position.

A controller 42 is used to signal pressurized air source valve 43 to flow the pressurized air 47 from a pressurized air source 48 to the back casing port 22. The pressurized air 47 then flows through the piston air passages 40 into the groove 28 causing the ring 38 to be pushed forward uncovering the rear port 34. This action allows the pressurized air 47 to flow through the rod air passage 32 to the nozzle 36 where it will be used for holding a nut 44 against a front end shoulder 46 of the rod 18 as discussed later on and illustrated in FIG. 3. The ring 38 comes to a rest against a backwards facing front annular wall surface 56 of the groove 28 and the pressurized air 47 then moves the piston 12 and the rod 18 forward. The piston 12 and the rod 18 move forward and the pin 33 enters a hole 50 of the nut 44 as illustrated in FIG. 2.

Figure 3:
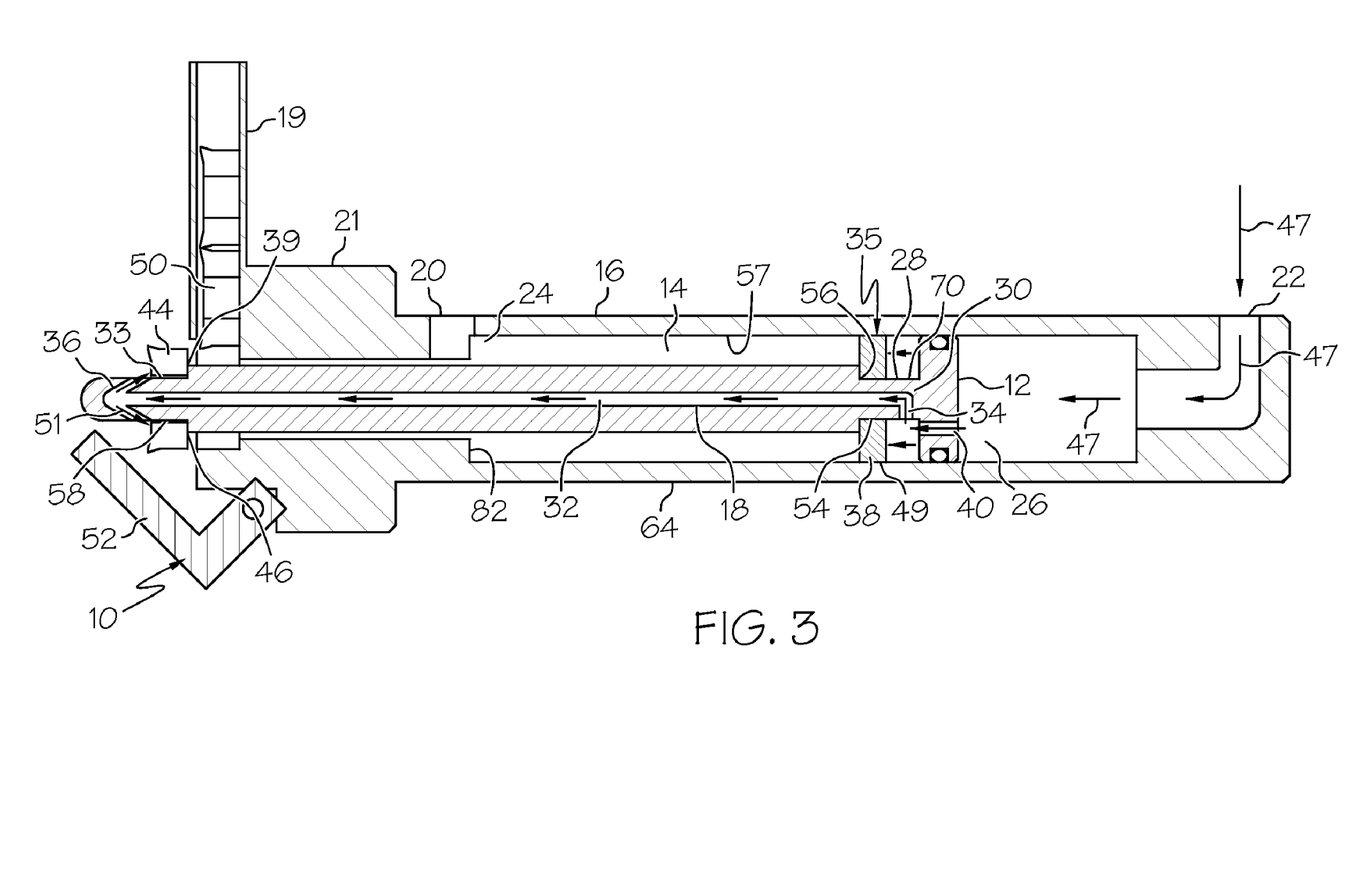
FIG. 3 is a cross-sectional view illustration of the cylinder illustrated in FIG. 1 with the rod extended with the pin and the nut opening a nut retaining door of the nut feeder.

As the piston 12 and the rod 18 moves further forward, the pin 33 containing the air nozzle 36 extends further into the hole 50 of the nut 44 as illustrated in FIG. 3. The pressurized air is aimed by the nozzle 36 back against the nut 44 to hold the nut 44 against the front end shoulder 46 of the rod 18. The nozzle 36 has one or more apertures 37 aimed backwards to direct a nozzle flow 51 back against the nut 44 such that the nozzle flow 51 holds the nut 44 against the front end shoulder 46 of the rod 18. Further illustrated in FIG. 3 is the rod 18 beginning to open a hinged door 52 that is in front of or part of the nut feeder 10. The door 52 axially restrains each of the nuts 44 in front of the rod 18. The door 52 is opened by the tip 58 of the nozzle and/or the nut 44 allowing the nut move forward to a final position P, illustrated in FIG. 5, where the nut is deposited for welding.

Figure 4:
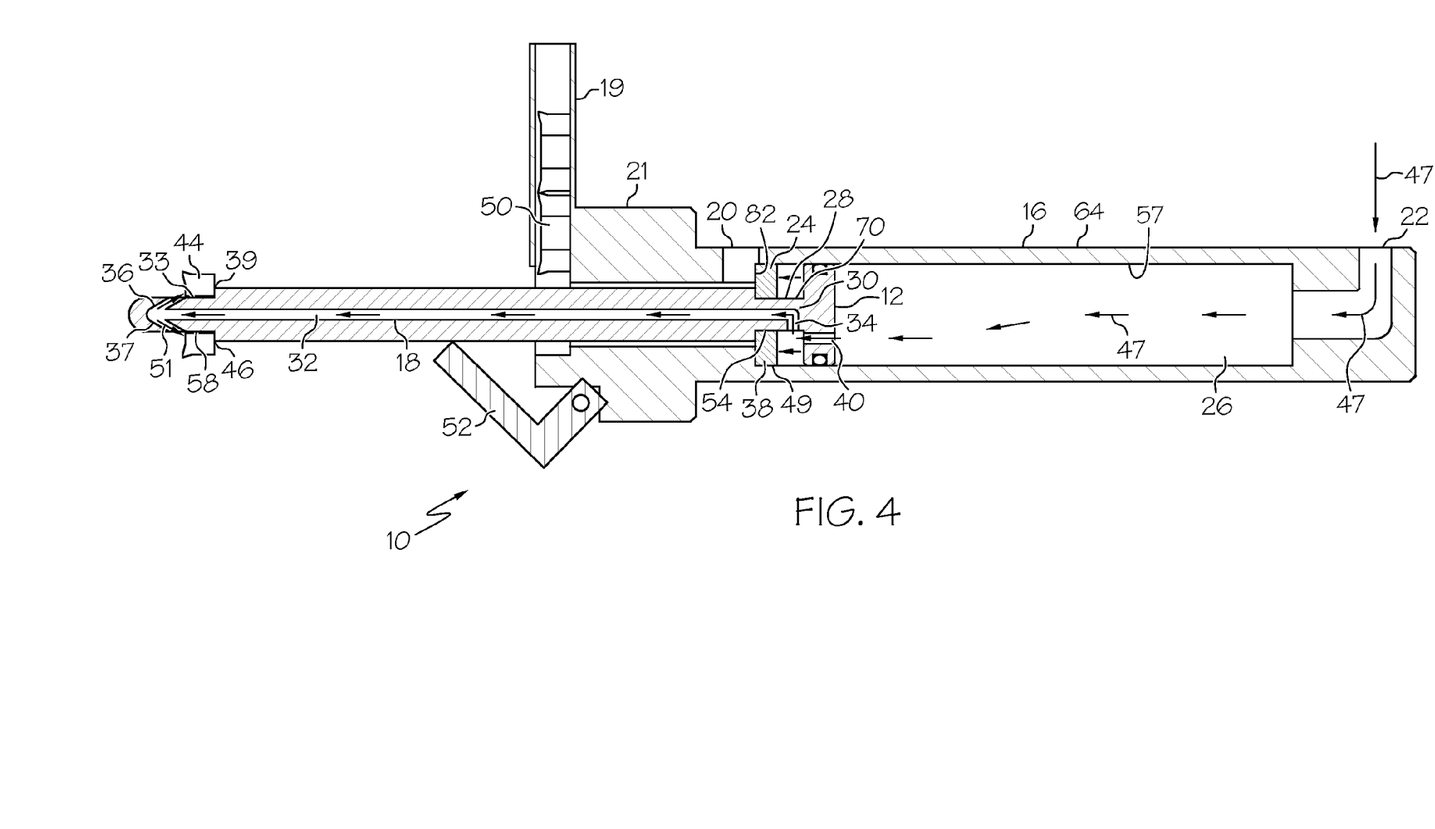
FIG. 4 is a cross-sectional view illustration of the cylinder illustrated in FIG. 1 with the rod extended and the nut nearly positioned to be deposited for welding.

Illustrated in FIG. 4 is the ring 38 having been pushed forward by the pressurized air 47 passing through the piston 12. The ring 38, having been slid forward within the groove 28, has come to a rest against a stop 82 at the front end 24 of the chamber 14 of the cylinder 16. Then, as illustrate in FIG. 5, the pressurized air 47 continues to move the piston 12 and the rod 18 forward while the ring remains at rest against the stop 82 at the front end 24 of the chamber 14 of the cylinder 16.

Figure 5:
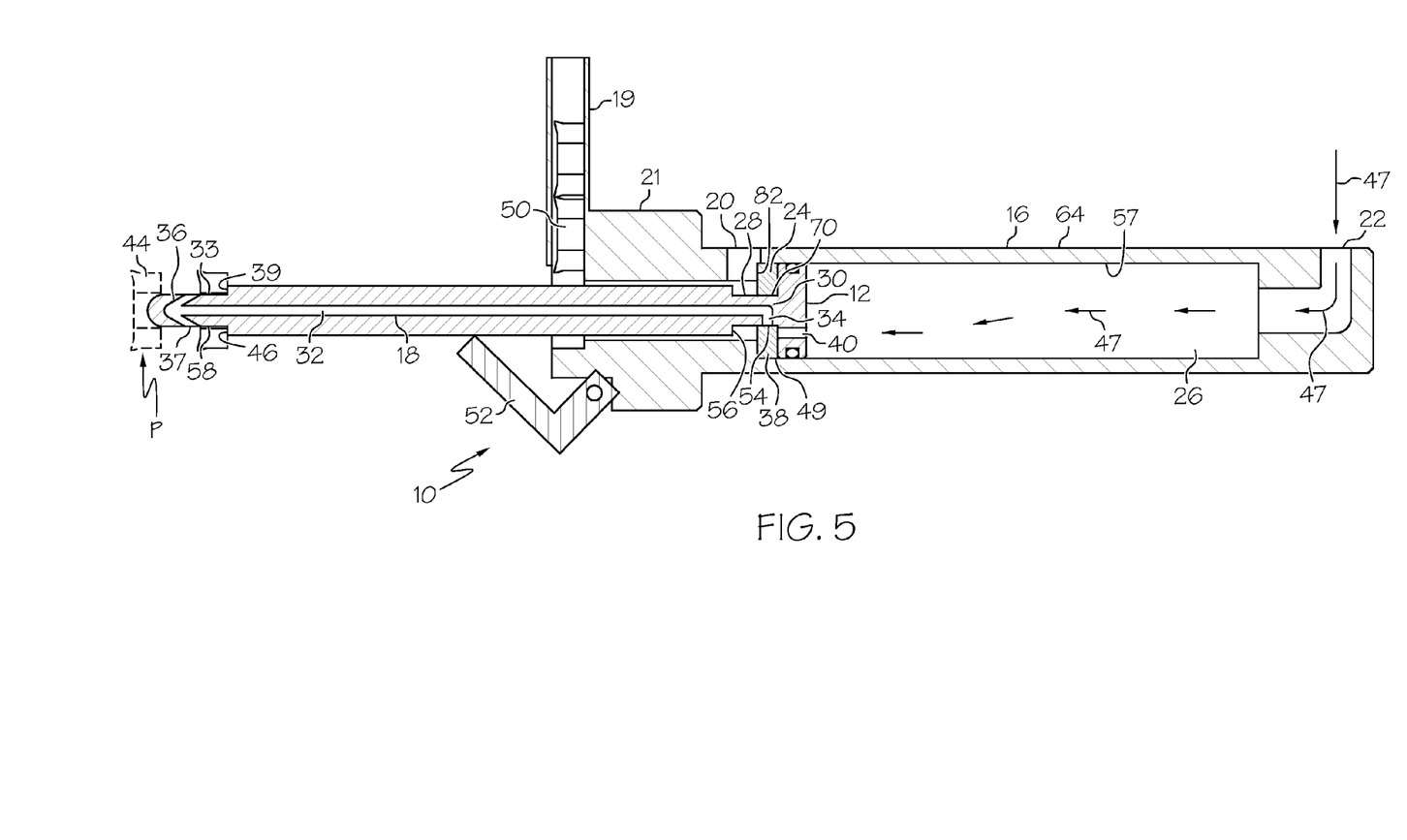
FIG. 5 is a cross-sectional view illustration of the cylinder illustrated in FIG. 4 with the rod fully extended and the ring valve in a fully closed position.

This action covers the rear port 34 cutting off the pressurized air 47 to and preventing the pressurized air 47 from flowing through the rod air passage 32 and the air nozzle 36 in the pin 33. This action releases the nut 44 which had been held against the pin by the pressurized air 47 flowing backwards from the nozzle 36 against the nut 44. The nut 44 is allowed to fall forward, as illustrated in FIG. 5 by the nut 44 drawn in dashed line, to a final position P where the nut is deposited for welding. The nut typically drops or falls by gravity because the cylinder 16 and the rod 18 are typically mounted at a sharp angle with respect to the ground.

Figure 6:
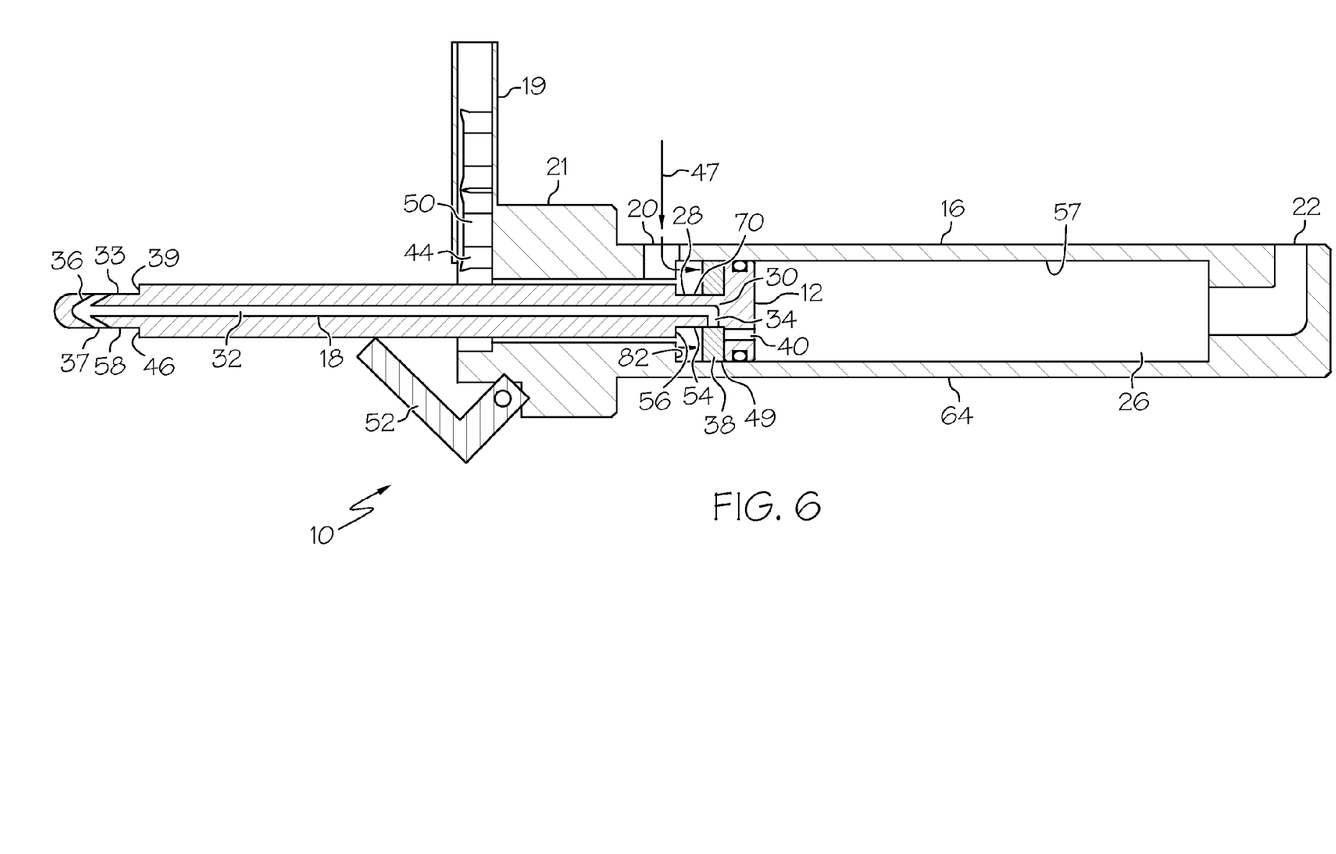
FIG. 6 is a cross-sectional view illustration of the cylinder illustrated in FIG. 5 with the control valve directing pressurized air to a front end of the chamber for moving the piston backwards and retracting the rod.
Figure 7:
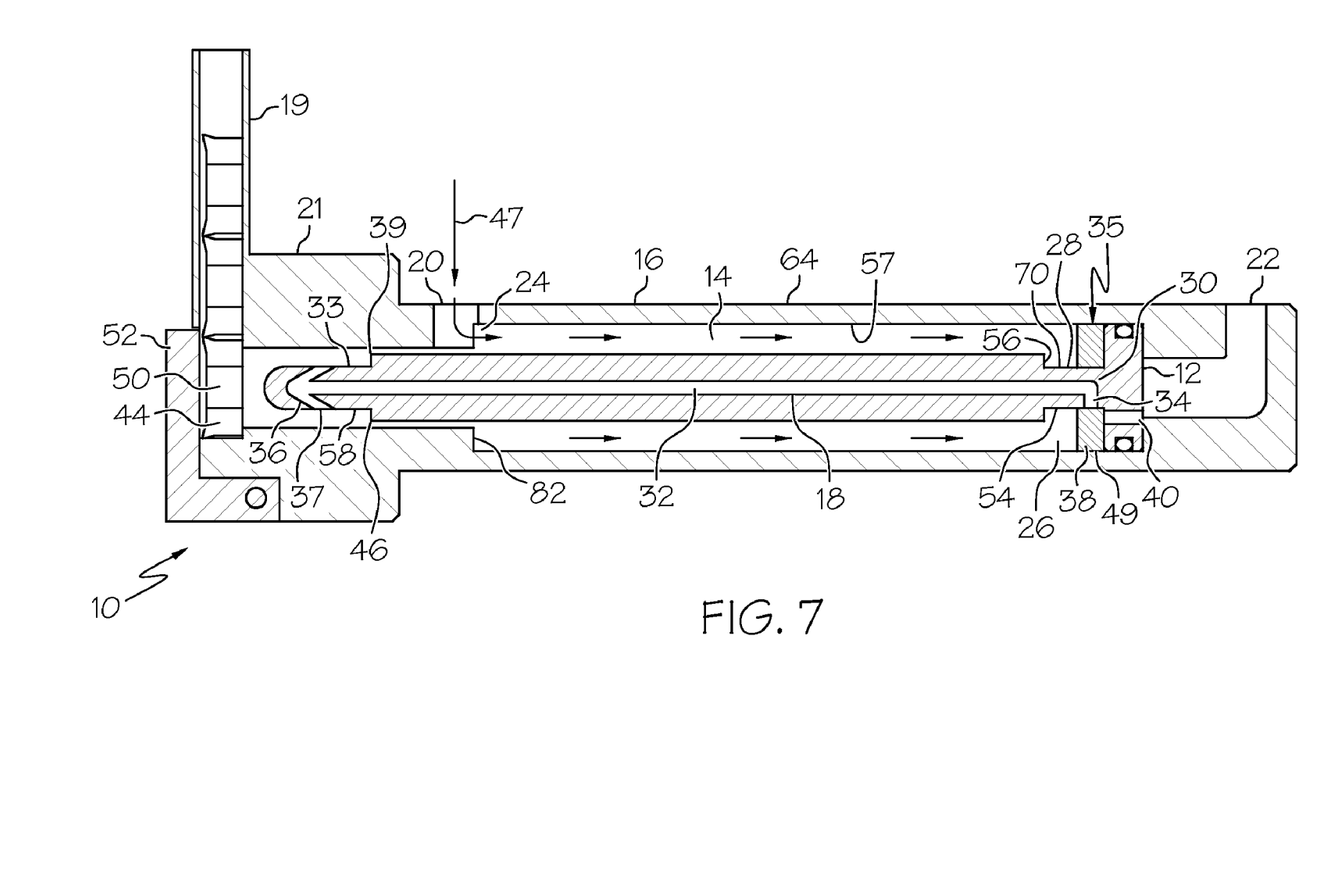
FIG. 7 is a cross-sectional view illustration of the cylinder illustrated in FIG. 6 with the pressurized air having moved the piston backwards and having moved the rod back in its fully retracted position.

FIG. 6 illustrates pressurized air 47 flowing to only the front casing port 20 after the controller 42 has signaled the pressurized air source valve 43 illustrated in FIG. 1 to do so. The pressurized air 47 enters the front casing port 20 of the chamber 14 causing the ring 38 to slide back against the piston 12 and cover the rear port 34. This is the beginning of a retraction portion of the cycle in which the piston 12 and rod 18 move backwards due to the pressurized air 47 flowing into and expanding in the front end 24 of the chamber 14. The piston 12 and the rod 18 move backward until the end of the cycle is reached as illustrated in FIG. 7. The piston 12 and rod 18 are fully retracted and the door 52 of the nut feeder 10 is fully closed and a new nut 44 is in place for the next cycle. The ring 38 is still held back against the piston 12 by the pressurized air 47 entering the front end 24 of the chamber 14 and covering the rear port 34. Thus the controller 42 is operably connected to the pressurized air source valve 43 for flowing pressurized air 47 through the front and back casing ports 20, 22 to the front and back ends 24, 26 of the chamber 14 alternately during a cycle of operation of the nut feeder 10.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

The invention claimed is:

1. A nut feeder comprising:
   a piston disposed within a chamber of a cylinder,
   a rod attached to the piston,
   a rod air passage extending through the rod from a rear port at a groove circumscribed around a back end of the rod to a front end of the rod, and
   a ring disposed within the groove and free to slide axially within the groove and to cover and uncover the rear port.

2. A nut feeder as claimed in claim 1 further comprising an air nozzle at the front end of the rod.

3. A nut feeder as claimed in claim 2 further comprising a pin containing the air nozzle at the front end of the rod.

4. A nut feeder as claimed in claim 3 further comprising the air nozzle including one or more apertures aimed backwards.

5. A nut feeder as claimed in claim 1 further comprising one or more piston air passages extending through the piston to the groove.

6. A nut feeder as claimed in claim 5 further comprising an air nozzle at the front end of the rod.

7. A nut feeder as claimed in claim 6 further comprising a pin containing the air nozzle at the front end of the rod.

8. A nut feeder as claimed in claim 7 further comprising the air nozzle including one or more apertures aimed backwards.

9. A nut feeder as claimed in claim 5 further comprising a stop at a front end of the chamber of the cylinder wherein the stop is positioned to stop forward movement of the ring and cause the ring to cover the rear port.

10. A nut feeder as claimed in claim 9 further comprising an air nozzle at the front end of the rod.

11. A nut feeder as claimed in claim 10 further comprising a pin containing the air nozzle at the front end of the rod.

12. A nut feeder as claimed in claim 11 further comprising the air nozzle including one or more apertures aimed backwards.

13. A nut feeder system comprising:
   a nut feeder having a piston disposed within a chamber of a cylinder,
   a rod attached to the piston,
   a rod air passage extending through the rod from a rear port at a groove circumscribed around a back end of the rod to a front end of the rod,
   a ring disposed within the groove and free to slide axially within the groove and to cover and uncover the rear port, and
   a nut dispenser and a door in front of the nut feeder are positioned and operable to axially restrain one of the nuts in front of the rod.

14. A nut feeder system as claimed in claim 13 further comprising:
   front and back casing ports at front and back ends respectively of the chamber,
   a controller operably connected to a pressurized air source valve for flowing pressurized air through the front and back casing ports to the front and back ends alternately during a cycle of operation of the nut feeder, and
   the ring and the groove being operable to uncover the rear port during forward movement of the rod and to cover the rear port during backward movement of the rod.

15. A nut feeder system as claimed in claim 14 further comprising an air nozzle at the front end of the rod.

16. A nut feeder system as claimed in claim 15 further comprising a pin containing the air nozzle at the front end of the rod.

17. A nut feeder system as claimed in claim 16 further comprising the air nozzle including one or more apertures aimed backwards.

18. A nut feeder system as claimed in claim 14 further comprising one or more piston air passages extending through the piston to the groove.

19. A nut feeder system as claimed in claim 18 further comprising an air nozzle at the front end of the rod.

20. A nut feeder system as claimed in claim 19 further comprising a pin containing the air nozzle at the front end of the rod.

21. A nut feeder system as claimed in claim 20 further comprising the air nozzle including one or more apertures aimed backwards.

22. A nut feeder system as claimed in claim 18 further comprising a stop at a front end of the chamber of the cylinder wherein the stop is positioned to stop forward movement of the ring and cause the ring to cover the rear port.

23. A nut feeder system as claimed in claim 22 further comprising an air nozzle at the front end of the rod.

24. A nut feeder system as claimed in claim 23 further comprising a pin containing the air nozzle at the front end of the rod.

25. A nut feeder system as claimed in claim 24 further comprising the air nozzle including one or more apertures aimed backwards.

* * * * *